Sept. 15, 1953 — C. J. BRUKNER — 2,652,215
AIRCRAFT LANDING GEAR
Filed Dec. 17, 1946 — 2 Sheets-Sheet 1

INVENTOR.
Clayton J. Brukner
HIS PATENT ATTORNEY

Sept. 15, 1953

C. J. BRUKNER 2,652,215

AIRCRAFT LANDING GEAR

Filed Dec. 17, 1946

INVENTOR.
Clayton J. Brukner
BY
HIS PATENT ATTORNEY

Patented Sept. 15, 1953

2,652,215

UNITED STATES PATENT OFFICE 2,652,215

AIRCRAFT LANDING GEAR

Clayton John Brukner, Troy, Ohio, assignor to The Waco Aircraft Company, a corporation of Ohio Application December 17, 1946, Serial No. 716,829

3 Claims. (Cl. 244—50)

The present invention relates to landing gears and more particularly to an improved landing gear adapted for the operation of aircraft under side drift conditions.

The landing and take-off of aircraft under side drift or cross-wind conditions has presented many problems and has been the cause of numerous aircraft accidents. Inasmuch as the number and direction of the runways of an airport are strictly limited by the inherent nature of the design of these airports, and winds are variable and likely to blow from any direction, it follows that it is not always possible to land directly into, or with the wind, and that most landings are necessarily made with some angle of side drift or a cross-wind. As this angle between the wind direction and that of the runway becomes greater, the landings or take-offs under these conditions become increasingly difficult.

In the case of airplanes provided with steerable nose wheels, the side forces exerted upon the pilot controls are frequently of such magnitude as to wrench the control away from the pilot at the instant of landing. This condition has been known to be so severe in certain aircraft that pilots have momentarily let the controls go free until this initial force has been dissipated. This is an extremely dangerous condition inasmuch as it occurs at an instant when it is frequently necessary for the pilot to apply corrective movements to the air or aerodynamic control surfaces in order to maintain the airplane in its proper attitude both laterally and directionally during the landing. It is to the elimination of these and other unsatisfactory operating conditions that the present invention is primarily directed.

Considerable experimentation has been made in an effort to solve the problems presented by side drift and cross-wind landings and a number of proposed arrangements have been suggested and tested. One of the proposed solutions has been to pre-set all of the landing wheels into a parallel tracking position prior to landing. It has also been proposed to automatically pre-set and lock each of the landing wheels into their parallel tracking position as a result of contact of the landing wheels with the ground. It has also been previously proposed that each main wheel of the landing gear be provided with an auxiliary wheel, in a lowered trailing position, which touches the ground first and automatically steers the main wheel with which it is associated.

The present invention is directed to an improvement in landing gears wherein either of the main wheels, when directionally deflected against resilient and hydraulic damping opposition, adjusts the nose wheel through a somewhat greater angle than the main wheel has been deflected and causes this adjustment in a manner which does not require movement of the pilot control. In a preferred embodiment of the present invention, the main wheels are jointly swivellable in parallel tracks against resilient and hydraulic damping means and these main wheels are normally forwardly aligned by a powerful resilient centering force. The present invention is applicable to landing wheels of the conventional or endless track type, skis, floats, etc., and is adapted for use in down-wind landings and take-offs, as well as the more conventional landings and take-offs into the wind, or with side wind conditions blowing laterally or at angles with respect to said landings and take-offs.

It is accordingly a major object of the present invention to provide an improved landing gear which is particularly adapted for use in side drift or cross-wind landings and take-offs. It is a further object to provide an improved tricycle type landing gear in which a normally steerable nose wheel is steered or its heading influenced by side loads or impacts to which either of the main landing gear wheels may be subjected by side drifting ground contact during landing. A further object of this invention resides in an arrangement in which the partial swivelling of the main wheels causes the nose wheel to be swivelled or moved through a greater angle without effecting the neutral position of the interconnecting flight or pilot controls. It is a still further object of the present invention to provide an improved linkage between the two swivellable main wheels and a combined resilient and hydraulic damper for both normally maintaining the wheels in a centered position, and resiliently and non-reactively opposing their displacement therefrom. A further object of this invention resides in the provision of a novel control arrangement interconnecting the pilot control with the respective landing wheels whereby these improved features and results are obtained. A further important objective of the invention resides in a novel and advantageous cooperative interconnection between the air and ground controls to provide an airplane of extremely simplified and satisfactory flying and landing characteristics. Other objects and advantages will occur to those skilled in the art after reading the present specification and the accompanying drawings, forming a part hereof, in which:

Figures 2, 3:
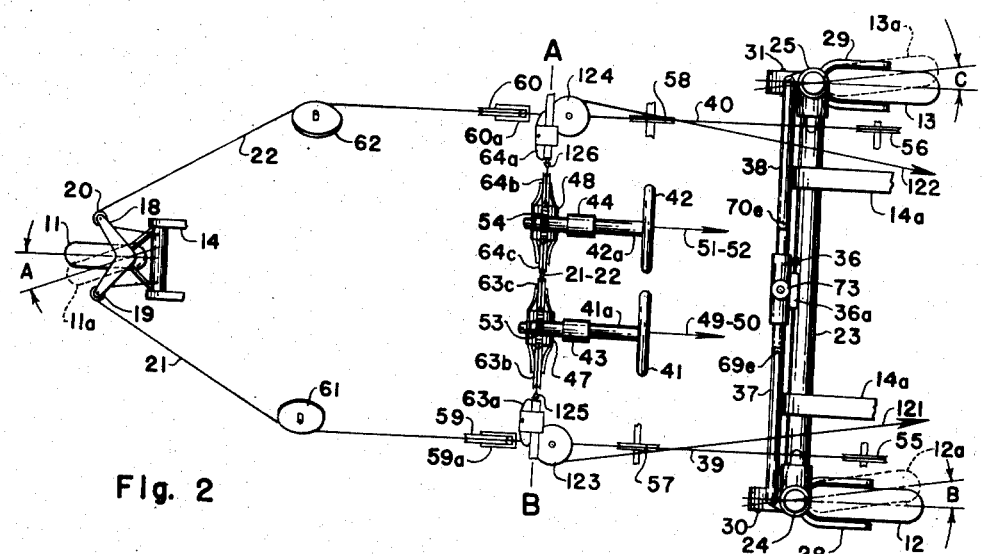
Fig. 2 is a plan view of the landing gear and associated mechanism shown in Fig. 1.
Fig. 3 is a side elevational view of the landing gear and mechanism shown in Figs. 1 and 2.

Referring now to Fig. 3 the numeral 10 indicates, in part, the fuselage outline of an airplane to which the improved landing gear of this invention is applied. The fuselage has a cockpit portion 10a from which the airplane is controlled in flight and from which it may be steered upon the ground, upon which it is supported by a landing gear of the tricycle type comprising the nose wheel 11 and the main wheels 12 and 13. As is usual in airplanes having this type landing gear, the center of gravity will be disposed slightly forward of the main wheels 12 and 13, and an appreciable distance to the rear of the nose wheel 11, as indicated in Fig. 3.

The nose wheel 11 is pivotally supported from the fuselage framework 14 by an approximately vertically disposed post journal 15 within which the landing gear member 16 is adapted to rotate or swivel. In an actual installation a rearward inclination of some 9 degrees gave satisfactory results. The member 16 preferably has pivoted thereto the wheel-carrying member 17 upon which the landing wheel 11 is rotatably mounted, and resilient means interposed between members 16 and 17 absorbs vertical impacts or shocks which the nose wheel 11 may be subjected to. This wheel mounting need not however be of the levered suspension type but may also be of the more common telescopic type of mountings using nut-cracker or other steering connections. In the upper end of the landing gear member 16 there is attached a forwardly diverging yoke member 18 at the forward ends of which there are pivotally mounted the cable sheaves 19 and 20, adapted to receive the steering cables 21 and 22, respectively, a forward terminal of each of which is anchored to the fuselage framework 14.

The main or rear wheels 12 and 13 are attached to the aircraft framework 14a through the medium of the cross tube 23, to the laterally disposed ends of which are fitted the post journals 24 and 25. Each main landing wheel is provided with a levered suspension unit comprising the upper members 26 and 27, respectively, having strut portions rotatable within the post journals 24 and 25, and are each provided with wheel-carrying levers, 28 and 29, which are provided with resilient shock-absorbing means to prevent folding of the members 26—28 and 27—29 about their common pivots 30 and 31, respectively. Each strut member 26 and 27 has attached thereto forwardly directed ears or lugs 32 and 33 as well as inwardly and laterally directed ears 34 and 35. Pivotally disposed between the forward ends of the ears 32 and 33 there is provided a damping unit 36 and the connecting push-pull rods 37 and 38, the details and operation of which will be hereinafter more fully explained.

The opposed inwardly directed terminals of the ears 34 and 35 have attached thereto a terminal of each of the cables 39 and 40 which cooperate with the above mentioned cables 21 and 22. Within the cockpit 10a of the airplane there is preferably provided a pair of control wheels 41 and 42 as also indicated in Figs. 2 and 3, and their respective shafts 41a and 42a are rotatable within the journal portions 43 and 44 at the upper ends of the columns 45 and 46. These columns are provided with lower pivot portions 47 and 48 which are rotatably mounted upon the fuselage structure such that the columns can be rocked within fore and aft vertical planes about the same transverse horizontal axis A—B. Control cables 49, 50, 51, and 52 are attached to the respective columns 45 and 46 above and below the horizontal axis A—B, and are connected to certain of the airplane flight control surfaces, as more fully described below. Sprockets 53 and 54 are connected to the forward ends of the shafts 41a and 42a respectively and are engaged by chain portions of the previously referred-to cables 21 and 22. The sprockets 53 and 54 are used to engage short lengths of chain in the upper runs of cables 21 and 22 to get positive drive through two full revolutions of the control wheel.

Somewhat to the rear and above the levers or ears 34 and 35, the cables 39 and 40 run over the sheaves 55 and 56 and then extend forwardly, engaging the additional sheaves 57 and 58 and terminating in the fittings 59a and 60a which are pivotally attached to the axes of the floating take-up sheaves 59 and 60. These take-up sheaves engage and ride upon the cables 21 and 22, being held in engagement therewith by the tension in the cables 39 and 40, and unlike the sheaves 55, 56, 57 and 58, which are mounted for rotation upon the aircraft structure upon fixed axes, the take-up sheaves 59 and 60 are free to follow paths which are determined by the forces to which the cables 21, 22, 39 and 40 are subjected.

The cables 21 and 22, in extending outwardly and rearwardly from the nose wheel yoke sheaves 19 and 20, engage the guide sheaves 61 and 62 from which they extend rearwardly to engage the take-up sheaves 59 and 60 and from which they extend upwardly to the respective control units 41 and 42. Additional guide sheaves 63a, 63b and 63c are engaged by the cable 21 as it extends up to and around the control sprocket 53, and similar guide sheaves 64a, 64b and 64c are engaged by the cable 22 as it extends up to and around the control sprocket 54. These guide sheaves are preferably mounted such that the cable contacting portions are tangent to the axis A—B, about which the columns 45 and 46 are adapted to rotate, and thereby permit such rotation of the columns without subjecting the cable sets 21—39 and 22—40 to tensioning or slackening. It will also be noted that the cables 21 and 22 may cross beneath the respective control sprockets 53 and 54 as indicated at 22a in Fig. 1, but while this schematic arrangement is entirely feasible, any possible interference due to crossing can be avoided by a different routing of the cables as design considerations may require whereby they permit the transmission of control forces from the wheels 41 and 42, and it will be understood that the adjacent ends of the cables 21 and 22 will be connected as at 21—22 along the axis A—B, and intermediate the columns 45 and 46, to form in effect together with the chain portions, a single continuous cable.

The control mechanism for the present landing gear is cooperatively interconnected with the aerodynamic or flight controls, and both the aerodynamic and ground controls of the presently described airplane are manually operated by means of the pilot control wheels 41 and 42. The ground control cables 21 and 22 are provided with air control counterparts 121 and 122 which are guided by the sheaves 123 and 124 respectively. The latter guide sheaves serve to bring the air control cables 121 and 122 into the transverse axis designated at A—B, in the region of which they are connected to the ground control cables 21 and 22 by the connectors 125 and 126, respectively. In a preferred form of airplane control to which the present landing gear is particularly adapted the control cables 49, 50, 51 and 52 extend rearwardly, through suitable control mechanism, to a pair of drooping ailerons and to the elevator surfaces, the latter being actuated by rocking movements of the control columns 45 and 46 about the transverse axis A—B. The control cables 121 and 122 preferably extend rearwardly to control mechanism by which they are connected to both the ailerons for conventional differential operation thereof for lateral control, and to the rudder surfaces for directional control. The present landing gear is accordingly particularly adapted for use in an airplane in which the lateral and directional flight controls may be operated from a single control device, and the directional ground control or steerable nose wheel may be operated from the same manual control device.

Figure 1:
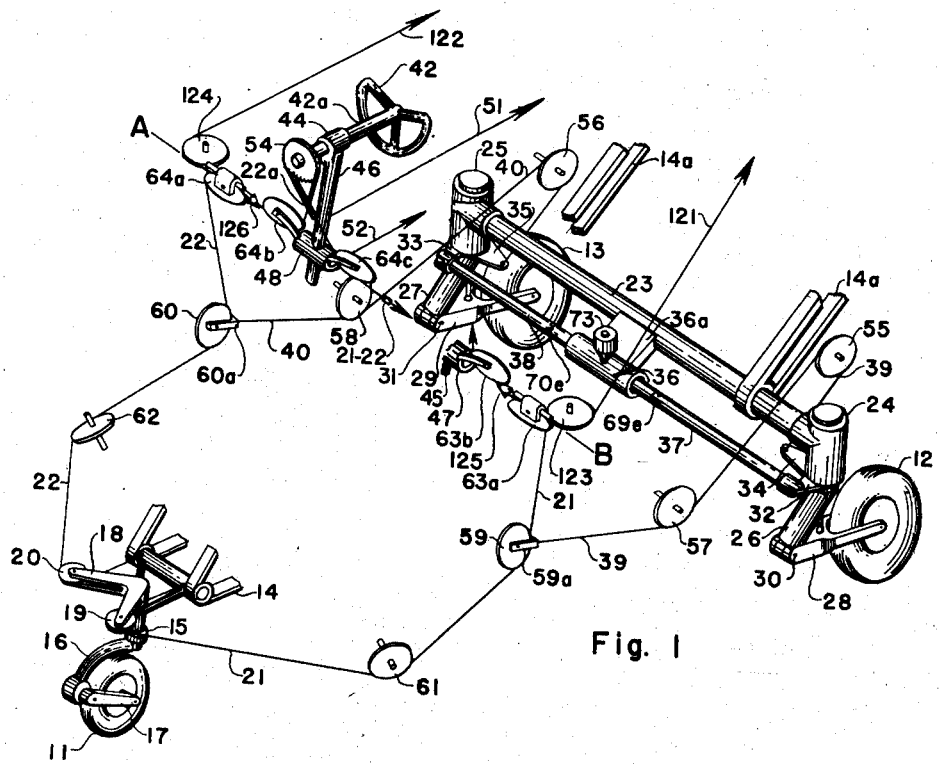
Fig. 1 is an isometric view of a preferred form of the present landing gear with its associated control mechanism.
Figure 4:
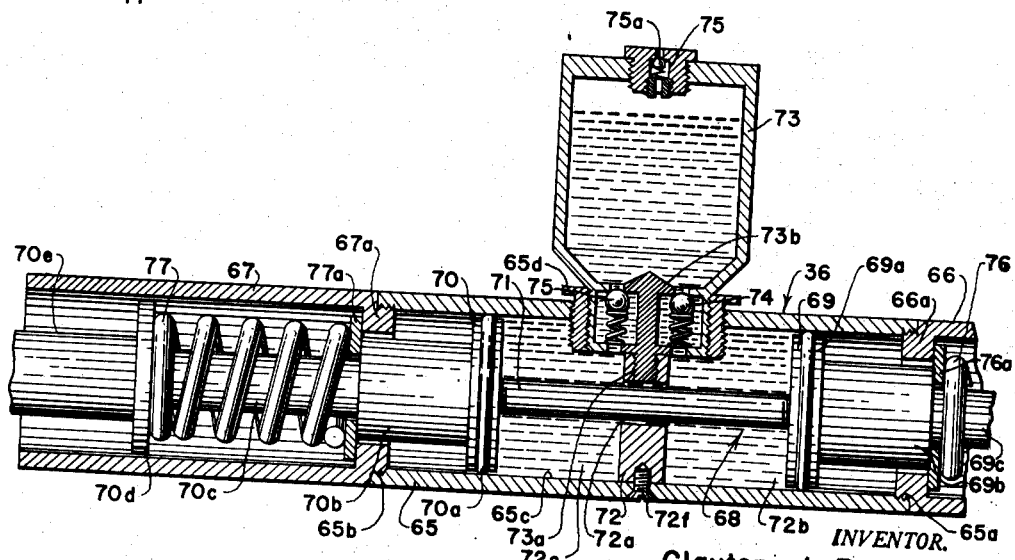
Fig. 4 is a detailed cross sectional view of a form of the resilient and hydraulic damping means interconnecting the main landing gear wheels.

A preferred form of the damping device 36 indicated in Fig. 1, is shown in detail in Fig. 4, and consists principally of a central tubular body portion 65 threaded at 65a and 65b to engage the end portions 66 and 67. The central portion 65 is intermediately bored at 65c to provide a cylinder within which a double piston unit 68 having pistons 69 and 70, is adapted to reciprocate, the pistons being interconnected by the piston rod 71 and provided with suitable packing seals 69a and 70a. Across the central portion of the cylinder unit 65 there is provided a partition or wall 72 centrally bored to provide a metering orifice 72a of slightly greater diameter than that of the piston rod 71 and through which fluid is forced to and from the compartments 72b and 72c as the pistons 69 and 70 are reciprocated within the cylinder 65c. The central wall 72 may preferably be positioned and anchored to the cylinder 65 by the threaded stud 72d.

A fluid reservoir 73 is threadedly attached to the transverse wall member 72 as at 73a, and to the cylinder wall 65 by the threaded bushing 65d. The reservoir is provided with communicating ports and check valves 74 and 75 on either side of its central dividing wall 73b which communicate respectively with the cylinder chambers 72b and 72c. A combined filling plug 75 and check valve 75a is provided through the upper end of the reservoir 73 to permit filling and venting as a result of dropping of the fluid level due to leakage past the piston packings.

The end units 66 and 67 adjacent the threaded connections 65a and 65b to the central unit 65 are provided with reduced diameter portions 66a and 67a through which the piston portions 69b and 70b are adapted to extend. These piston portions are each provided with reduced diameter portions 69c and 70c and shouldered portions 70d against which compressed springs 76 and 77 are adapted to bear. At the inner ends of these compressed springs are located washers 76a and 77a, which at the normal central position of the dual pistons 69 and 70 are caused to bear against the shouldered ends of the piston portions 69b and 70b, as well as the reduced diameter portions 66a and 67a. The outer ends of each piston portion are provided with pivotal or clevis connections 69e and 70e, by which the damping device is connected to the respective push-pull rods 37 and 38 as shown in Fig. 1. As indicated in the latter figure, the damping unit 36 is rigidly attached to the cross tube 23 through its rearwardly and upwardly extending plate portion 36a such that the damping unit is at all times maintained in a central position with respect to the vertical axes of the post journal portions 24 and 25.

Reference to Fig. 2, in conjunction with the other figures, will facilitate an understanding of the operation of the present landing gear. Assuming that the airplane is approaching a landing runway with a cross-runway wind coming obliquely from the right side and appreciable drift has been imparted to the airplane causing it to head toward the right of its line of motion parallel to the runway. Let us assume that the left main landing wheel 12 strikes the ground first and is deflected into the dotted line position 12a, through the angle B. Rotation of the wheel 12 and its associated strut 26 results in similar rotation of the ears 32 and 34 shown in Fig. 1, the rotation being in the same direction but 90° apart. Movement of the ear 32 is resiliently opposed by the compression spring 77, Fig. 4, within the combined centering and damping device 36, and is also opposed by the displacement of the fluid within the chamber 72c, through the metering orifice 72a, into the chamber 72b. As this resilient and non-reactive opposition to movement is overcome, however, and simultaneously as the wheel 12 is displaced, its counterpart, the other main landing wheel 13, is moved through an angle C, equal to the angle B through which the wheel 12 has been rotated.

When the main landing gear wheels 12 and 13 are rotated into the dotted positions 12a and 13a respectively, as shown in Fig. 2, the rotation of the ear 34 creates tension in the attached cable 39 and results in rearward rotation of the ear 35 in the opposite direction about the axis of the post bearing 25, causing slackening, or paying out, of the cable 40. Tensioning of the cable 39 causes the floating or take-up pulley 59 to be drawn downwardly and rearwardly thereby also tensioning the cable 21 with which it is engaged. Inasmuch as the rearward and upward run of the cable 21 extends through the guide sheaves 63a and 63b and over the control sprocket 53, and after passing beneath the guide sheave 63c is interconnected at 21—22 with the corresponding rearward run of the cable 22 which is also similarly guided and engaged by its control sprocket 54, any downward and forward pull on either of these cable portions will tend to rotate the control wheels 41 and 42. The pilot at this instant however, would normally be firmly holding one of the control wheels 41 or 42, and since one of these wheels would be restrained from turning it would serve to fixedly anchor the rearward run of the cable 21 (subjected to the downward movement by the cable 39 and the floating sheave 59) the forward portion of the cable 21 moves rearwardly and thereby causes rotation of the nose wheel yoke 18, by virtue of the cable engaging the sheave 19. Similar rotation of the sheave 20 with the yoke 18 causes a forward movement of the cable 22 and inasmuch as the rearward portion of this cable is anchored by its engagement with the restrained control sprocket 54, and also by its connection 21—22 with the rearward similarly restrained portion of the cable 21, the tensioned cable 22 tends to straighten out between sheaves 62 and 64a and to pull the floating sheave 60 upwardly and forwardly to the same extent to which the cable 48 has been slackened or payed out, as previously described. The arrangement of the mechanism is such that the angle A through which the nose wheel 11 is rotated into its position 11a is appreciably greater than the angles B or C, through which the main wheels 12 and 13 have been rotated. The setting of the nose wheel to a greater angle than the main wheels serves to assist in more rapidly bringing the airplane into the desired heading direction of its line of motion.

This automatic setting of the nose wheel 11 will be caused by lateral deflection forces on either one or both of the main wheels 12 and 13. It has the distinct advantage that it can automatically set or position the nose wheel 11 without required movement of the pilot control, as only a relatively small holding force would necessarily be applied to the control wheels 41 and 42 to cause the cables to automatically steer the nose wheel by deflection of the main wheels. This has the effect of placing the nose wheel into a new mid-position with respect to the pilot control in which it is correctly set for the landing and from which new mid-position the pilot can continuously steer the nose wheel to either side as landing conditions may require. Another advantageous result which is accomplished by this improved arrangement is derived from the movement of the nose wheel through a greater angle than the rear wheels in such a manner that any desirable air control which is made by the pilot can be exercised without positioning the front wheel in a direction which is adverse to the drifting direction of the aircraft. In other words, in a landing which would cause the landing gear to assume the dotted line position shown in Fig. 2, in the event the pilot at the instant of landing found it necessary to apply a corrective control force to his air controls to laterally correct any slight transverse unbalance which may result from drifting contact with the ground, he could accomplish this without rotating the nose wheel into a position in which it would be across the direction in which the airplane was drifting. Similarly any corrective rudder movement to the left would cause the nose wheel 11 to move through a relatively smaller angle from the optimum position than it would without the automatic setting provided by the present landing gear arrangement.

As the airplane's heading is steered into the direction of its travel, the side forces on the rear wheels proportionately decrease so that the compression spring 77 in the damping device 36 gradually overcomes the side forces applied to the wheels 12 and 13, as well as the resistance to the movement of the piston 70. As this continues, the main wheels are restored to their central fore and aft direction and the relative tensioning of the cables 39 and 40 is released and they become restored to their initial neutral position. This has the effect of returning the nose wheel 11 to its normal mid-position with respect to the air controls and in the event it requires any further corrective adjustment the pilot is free to steer the nose wheel concurrently with his air controls during the period in which the airplane is completing its landing run. It will accordingly be noted that when the side drift causes swivelling of the rear wheels against the elastic and energy absorbing restraint of the unit 36, the nose wheel is swivelled through a greater angle without any movement of the pilot's hand wheel; thus it is possible for the pilot to use instinctive momentary opposite control should a wing dip without causing any serious adverse effect upon the directive position of the nose wheel.

The resilient hydraulic damping device 36 is shown in Fig. 4 in its central neutral portion. It will be noted that through this device and the push-pull rods 37 and 38 the ears 32 and 33 of the respective landing gear units are rigidly interconnected in such manner that the wheels 12 and 13 are at all times caused to track along parallel planes. As the wheel 12 is caused to move through the angle B, into the dotted line position 12a the push-pull rod 37 is drawn toward the left side of the airplane on which the wheel 12 is mounted and since the unit 36 is fixedly attached through the web 36a to the cross tube 23 the spring 77 will be caused to be compressed by the washer 70d as it moves toward the reduced diameter portion 67a against which is disposed the washer 77a. As the shouldered portion 69b however causes the washer 76a to move away from the abutment 66a the spring 76 is moved toward the right with the shaft 69c without permitting the spring 76 to extend and thus exert its precompression energy to assist further movement in opposition to the restraint of spring 77. As the piston 70 moves toward the central partition 72 the displaced fluid is forced through the annular metering orifice 72a serving to oppose and damp the movement. The reservoir 73 is kept reasonably filled with hydraulic fluid and in the event of slight leakage past the packings in the pistons 69 and 70 repelinishing flow is permitted past the check valves 74 and 75 to replace any fluid which may have become lost. The fitting 75 at the top of the reservoir 73 provides for filling of the reservoir and includes the check valve 75a which prevents spilling of the fluid when the main landing gears are retracted about the axis of the cross tube 23, and also permits venting of the interior of the reservoir.

It will accordingly be noted that a relatively effective mechanism is provided to cause positioning of the nose wheel by displacement of the main wheels without effecting the neutral position of the flight controls, or the pilot controls. In other words, this automatic positioning is accomplished while the flight control is held stationary by the pilot without disturbing his handling of that control. It also has the effect of placing the nose wheel into a new mid-position in the optimum attitude for a side drift landing and from which mid-position the pilot can apply any necessary further steering movements in the same manner that he would if the nose wheel had not been displaced. While the present invention has been shown and described as applied to a three wheel tricycle landing gear, it is equally adapted for use in a landing gear having one or more rear main wheels, as well as landing gears having more than one forward or nose wheel.

The dvantageous results of the present invention are obtainable in landing gears of both the fixed and retractable type, the landing gear shown being readily adapted for rotation about the transverse tubular members indicated at 14 for the nose wheel and at 23 for the main rear wheels. The improved landing gear also provides a very satisfactory restraint against swivelling action of the main wheels by the drag linkage 37—38 and damping mechanism 36 serving as a neutralizing snubber and shimmy arrester containing the two precompressed coil springs 76 and 77 and the hydraulic energy absorbing snubber 68; the springs being installed in such a manner that they each act in one direction only and do not counteract each other, that is to say, neither spring urges the motion beyond the neutral position when returning to neutral. Therefore, a very positive central position is urged by the two springs until sufficient side load is developed to cause displacement from this neutral position.

Accordingly, with the present improved landing gear and operating mechanism as described above, a novice pilot may continue to exercise his instinctive training and not be forced to acquire the additional experience and courage to abandon the controls at some precise instant during a drifting landing and to temporarily trust his craft to the mercy of air gusts and ground irregularities. Or, stating this advantage in other language, it is not dangerous for the pilot to simply learn to allow the control wheel to rotate by slipping within his hands when the nose wheel castering forces in drift urge it to do so. Were this done in a conventional tricycle landing gear with a wheel-steered nose wheel, it would result in a movement of the lateral air controls to add to the tipping or unbalancing which might result from drifting contact with the ground. In contradistinction to this, the present mechanism provides that either or both the nose wheel and the control wheel will be moved by the swivelling movement of the rear wheel, with the following two advantageous results; (1) The nose wheel will freely caster-steer to the direction of its motion; and (2) The remaining cable travel which is not here used to over-steer the nose wheel will produce rotation of the control wheel, and in the direction which produces lateral air control to subtract from the tipping which may result from drifting contact with the ground, to thereby provide a very distinct and advantageous improvement in safety and in simplified flying.

Other forms and modifications of the present invention both with respect to its general arrangement and the details of its respective parts which will occur to those skilled in the art after reading the present description are intended to come within the scope and spirit of this invention as more particularly set forth in the appended claims.

I claim:

1. In an aircraft landing gear including a forwardly disposed steerable nose wheel and a pair of rearwardly disposed main wheels, said main wheels being laterally spaced and pivotally mounted for swivelling movements, a rod member interconnecting said swivelling main wheels for simultaneously swivelling movements, a cylinder element fixedly mounted upon the aircraft through which said rod member is arranged to reciprocate, damping means associated with said cylinder element for opposing rapid reciprocating movements of said rod member therethrough, a fixed abutment carried by said cylinder element, a stop portion carried by said rod member, resilient means anchored at a first terminal to said rod member and maintained in a state of initial compression by engagement of its second terminal with said stop portion of said rod member, said second terminal of said resilient means also arranged upon movement of said rod member for engagement with said fixed abutment carried by said cylinder element, said abutment, said stop portion and said resilient means arranged in such manner that movement of the rod member in one direction is resiliently opposed by further compression of said resilient means upon engagement of said second terminal of said resilient means with said fixed abutment, and opposite movement of said rod member is unassisted by the compressed state of the said resilient means, said stop portion preventing engagement of said resilient means whereby said main wheels are resiliently and non-reactively centered in their normal aligned central positions.

2. In an aircraft landing gear including a pair of laterally spaced main wheels, said main wheels being pivotally mounted upon the aircraft for swivelling movements, a rod member interconnecting said main wheels for maintaining simultaneously swivelling movements, piston means carried by said rod member, a cylinder element fixedly mounted upon the aircraft within which cylinder element said rod member and piston means are arranged to reciprocate, and damping means associated with said cylinder element for opposing rapid reciprocating movements of said piston means therethrough, a fixed abutment carried by said cylinder element, a fixed abutment carried by said rod member, a movable abutment carried by said rod member engageable with said fixed cylinder abutment, stop means carried by said rod member arranged to limit the separating movement of said abutments, precompressed resilient means interposed between said fixed and movable abutments carried by said rod member tending to move said movable abutment toward said cylinder abutment arranged in such manner that swivelling of said main wheels and movement of said rod member in one direction is resiliently opposed by further compression of said resilient means upon engagement of said movable abutment with said fixed cylinder abutment, and movement in the opposite direction is unassisted by said resilient means as a result of said stop means preventing further expansion of said compressed resilient means and engagement of said fixed cylinder abutment by said movable abutment on said rod member.

3. In an aircraft having a pair of laterally spaced swivelling landing gear units, a non-reactive centering and damping device comprising a rod member interconnecting said landing gear units for maintaining simultaneous parallel swivelling movements, a cylinder fixedly mounted upon the aircraft, piston means carried by said rod member arranged for reciprocating movements within said cylinder, damping means associated with said cylinder for opposing rapid reciprocating movements of said piston means wthin said cylinder, said cylinder having laterally spaced transverse abutment portions disposed on opposite sides of said piston means, resilient non-reactive centering units carried by said rod member on opposite sides of said piston means and engageable with said transverse abutment portions of said cylinder, each said resilient centering unit comprising a compression spring having a first terminal fixed to said rod member and its opposite terminal bearing against a disc member slidable along said rod member and stop means carried by said rod member to limit the movement of said disc member along said rod member under the influence of said compressed spring, the arrangement being such that displacement of one of said landing gear units imparts reciprocating movement of said rod member within said cylinder in a given direction causing engagement of said transverse abutment on said cylinder with said sliding disc and compression of one of said springs only, the other said spring being prevented from further expansion by engagement of its sliding disc member with said corresponding stop portion on said rod member.

CLAYTON JOHN BRUKNER.

References Cited in the file of this patent

UNITED STATES PATENTS

| Number | Name | Date |
|---|---|---|
| 1,273,059 | Hild | July 16, 1918 |
| 2,345,405 | McLaren et al. | Mar. 28, 1944 |
| 2,355,026 | Koppen | Aug. 1, 1944 |
| 2,460,506 | Jamison | Feb. 1, 1949 |
| 2,502,522 | Hoobler | Apr. 4, 1950 |

FOREIGN PATENTS

| Number | Country | Date |
|---|---|---|
| 109,154 | Australia | Feb. 22, 1940 |